United States Patent
Katoh et al.

(10) Patent No.: US 9,615,031 B2
(45) Date of Patent: Apr. 4, 2017

(54) IMAGING DEVICE AND SCENE DETERMINATION METHOD

(71) Applicant: JVC KENWOOD Corporation, Yokohama-shi, Kanagawa (JP)

(72) Inventors: Hidehiro Katoh, Yokohama (JP); Takashi Sueda, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 0 days.

(21) Appl. No.: 14/834,477

(22) Filed: Aug. 25, 2015

(65) Prior Publication Data

US 2016/0065823 A1    Mar. 3, 2016

(30) Foreign Application Priority Data

Sep. 1, 2014 (JP) .................................. 2014-176743

(51) Int. Cl.
*H04N 5/235*    (2006.01)

(52) U.S. Cl.
CPC ......... *H04N 5/2353* (2013.01); *H04N 5/2351* (2013.01); *H04N 5/2357* (2013.01)

(58) Field of Classification Search
CPC .................................................. H04N 5/2353
See application file for complete search history.

(56) References Cited

FOREIGN PATENT DOCUMENTS

JP    2013150153 A    8/2013

*Primary Examiner* — Gary C Vieaux
(74) *Attorney, Agent, or Firm* — Nath, Goldberg & Meyer; Jerald L. Meyer; Leonid D. Thenor

(57) ABSTRACT

An imaging unit is configured to capture images of a subject. A sensor is configured to detect brightness. A first detector is configured to detect whether or not a period during which a predetermined brightness has been detected by the sensor continues for a first period of time. A second detector is configured to detect whether or not a period during which the predetermined brightness has been detected by the sensor continues for a second period of time shorter than the first period of time. A determiner is configured to determine a circumstance where the imaging unit captures images of the subject in a daytime in a specific state where light is temporarily cut off, based on a first detection result by the first detector and a second detection result by the second detector.

6 Claims, 5 Drawing Sheets

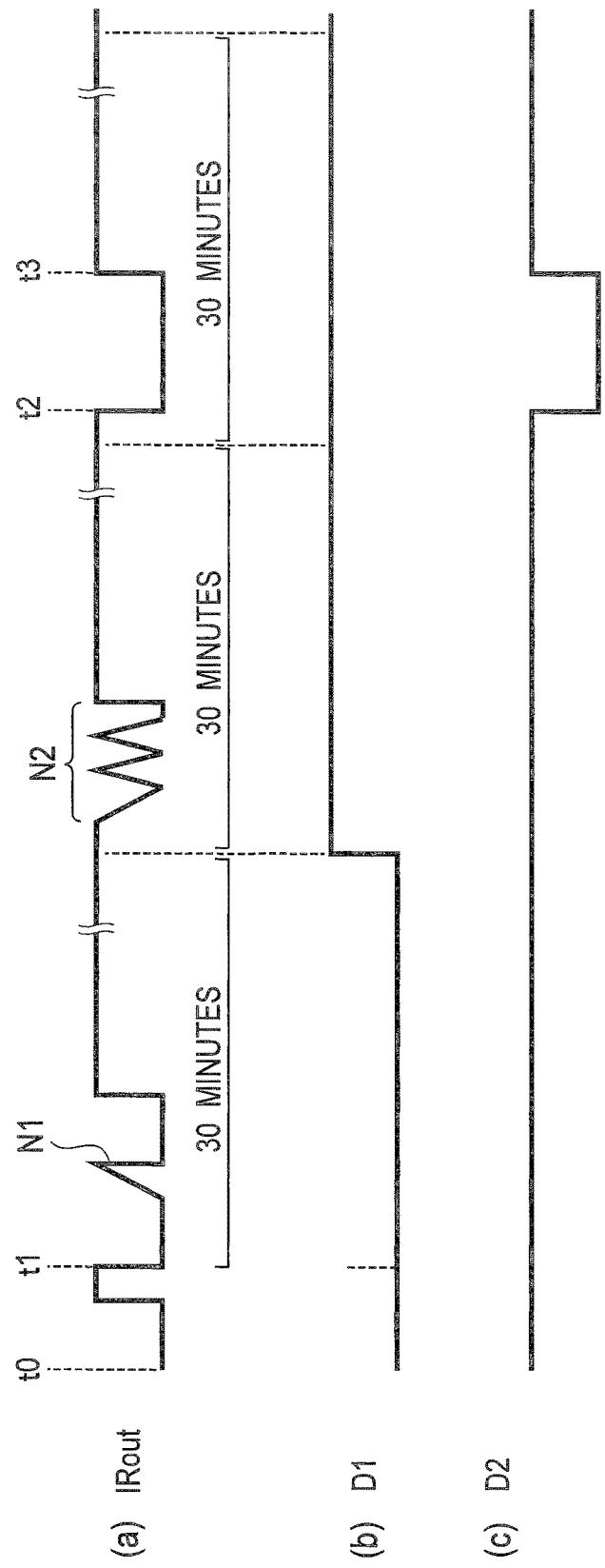

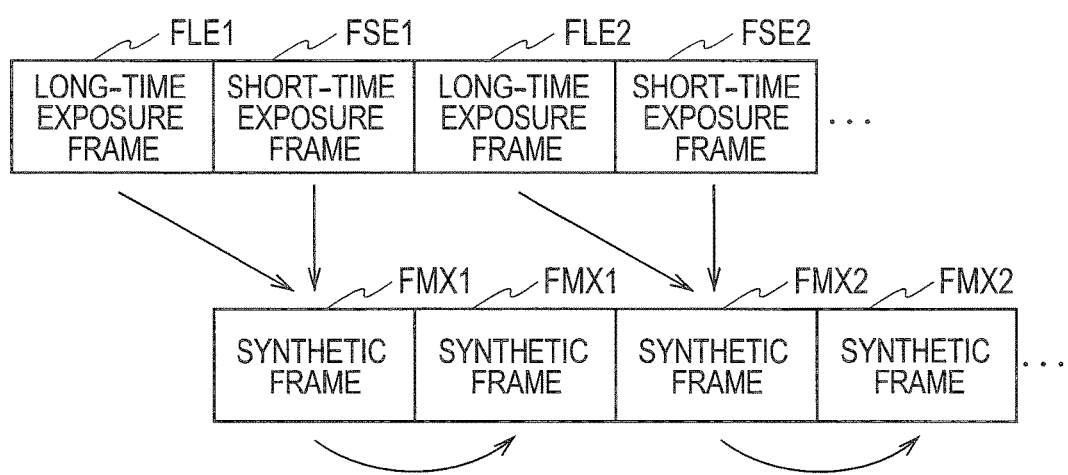

IMAGING DEVICE AND SCENE DETERMINATION METHOD

CROSS REFERENCE TO RELATED APPLICATION

This application is based upon and claims the benefit of priority under 35 U.S.C. §119 from Japanese Patent Application No. 2014-176743, filed on Sep. 1, 2014, the entire contents of which are incorporated herein by reference.

BACKGROUND

The present disclosure relates to an imaging device and a scene determination method.

In general, an imaging device controls a state (for example, luminance) of a video signal generated by capturing images of a subject to be prevented as much as possible from being changed even when an outside circumstance (for example, brightness) is changed.

SUMMARY

As an imaging device, there is a so-called in-vehicle camera that is installed in a vehicle and captures images of the outside. For example, in a case where the vehicle drives on a highway in the daytime, the scene suddenly gets dark when the vehicle enters a tunnel, and the scene gets suddenly bright when the vehicle comes out of the tunnel. When the in-vehicle camera captures images of the subject, the brightness may suddenly change.

Here, the in-vehicle camera is taken as an example, the same as above also applies to a case where a general video camera captures images of the outside from the inside of the vehicle. Note that the tunnel is an example of a specific state where light is temporarily cut off in a circumstance where the imaging device captures images of the subject in the daytime.

In order that the imaging device controls the state of a video signal outputted therefrom to be prevented as much as possible from being changed, a control with higher responsiveness than previous is required; however, it is not advisable to impair the stability of control. Accordingly, it is required that, without impairing the stability of control, the imaging device determines a specific state such as a tunnel accurately, and controls the state of the outputted video signal not to be changed.

A first aspect of the embodiments provides an imaging device including: an imaging unit configured to capture images of a subject; a sensor configured to detect brightness; a first detector configured to detect whether or not a period during which a predetermined brightness has been detected by the sensor continues for a first period of time; a second detector configured to detect whether or not a period during which the predetermined brightness has been detected by the sensor continues for a second period of time shorter than the first period of time; and a determiner configured to determine a circumstance where the imaging unit captures images of the subject in a daytime in a specific state where light is temporarily cut off, based on a first detection result by the first detector and a second detection result by the second detector.

A second aspect of the embodiments provides a scene determination method comprising: detecting whether or not a period during which a predetermined brightness has been detected by a sensor that detects brightness continues for a first period of time; detecting whether or not a period during which a predetermined brightness has been detected by the sensor continues for a second period of time shorter than the first period of time; determining that a scene is in a nighttime unless a period during which the predetermined brightness has been detected continues for the first period of time; determining that a scene is in a daytime if a period during which the predetermined brightness has been detected continues for the first and second period of time; and determining that a scene is in a daytime in a specific state where light is temporarily cut off, if a period during which the predetermined brightness has been detected continues for the first period of time and unless a period during which the predetermined brightness has been detected continues for the second period of time.

BRIEF DESCRIPTION OF THE DRAWINGS

FIG. 5 is a waveform chart for explaining operations of the scene determiner 103 shown in FIG. 4.

FIG. 6 is a table showing determination criteria for scenes by a scene determination method of at least one embodiment, and for explaining determinations for scenes by the scene determiner 103 shown in FIG. 4.

FIG. 7 is a diagram for explaining operations of multiple exposure.

DETAILED DESCRIPTION

A description is made below of an imaging device and scene determination method of at least one embodiment with reference to the accompanying drawings. It is assumed that the imaging device of the embodiment is an in-vehicle camera.

Figure 1:
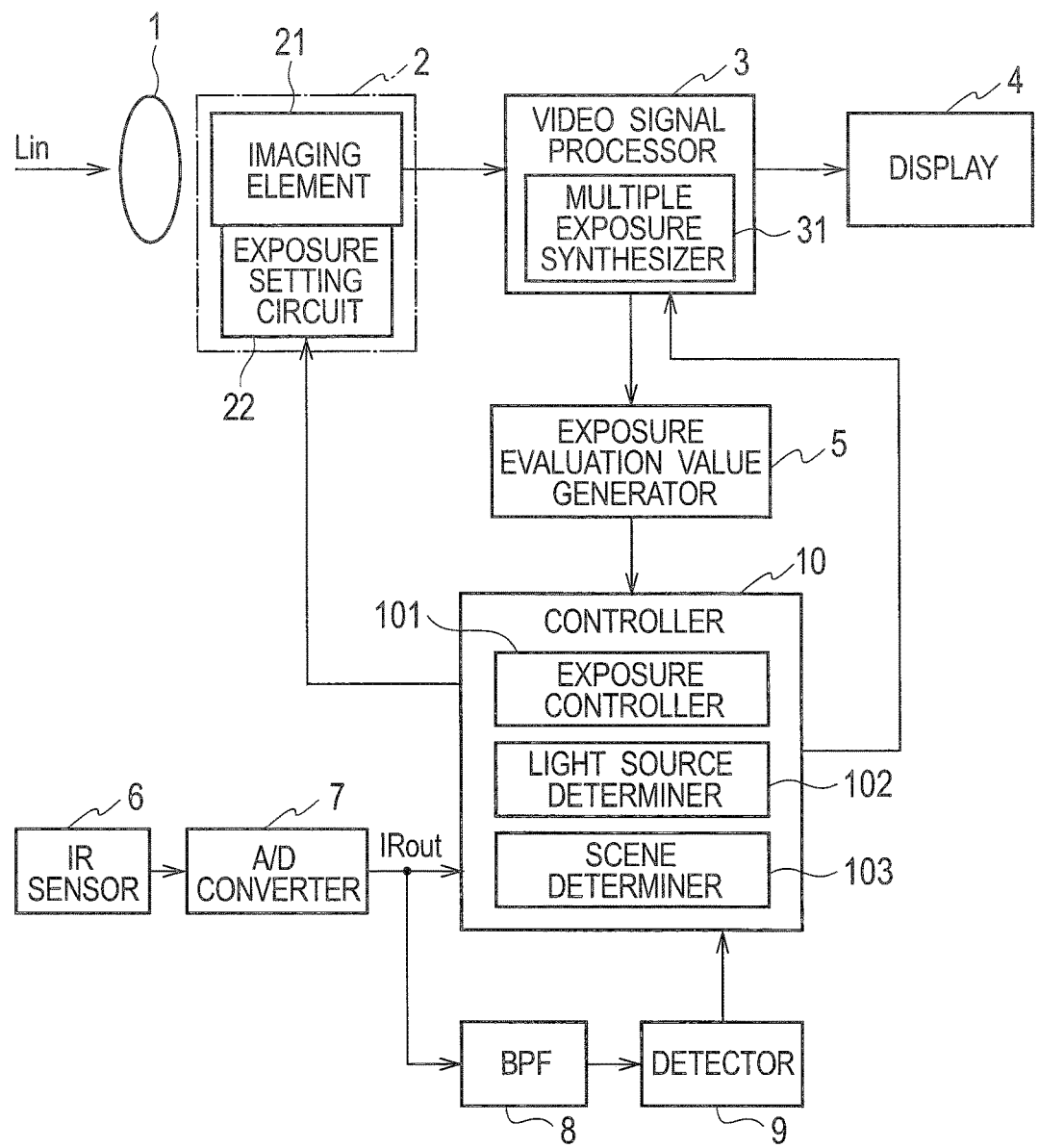
FIG. 1 is a block diagram showing an imaging device of at least one embodiment.

In FIG. 1, input light Lin is inputted to an imaging unit 2 from an outside through a lens 1. Here, it is assumed that the lens 1 is one; however, the imaging device actually includes a plurality of lenses. The imaging unit 2 includes an imaging element 21 and an exposure setting circuit 22 for setting a way of exposure in the imaging element 21.

For example, the imaging element 21 is a CMOS (Complementary Metal Oxide Semiconductor) sensor. The imaging element 21 may be a CCD (Charge Coupled Device) sensor.

The imaging element 21 performs photoelectric conversion for the input light Lin, and for example, outputs an RGB signal. The RGB signal is inputted to a video signal processor 3. The video signal processor 3 generates a luminance signal (Y signal) and a chrominance signal (C signal) based on the RGB signal, and implements a variety of signal processing thereafter. The video signal processor 3 supplies a video signal to a display 4.

The video signal processor 3 can be composed of a circuit. The display 4 is an arbitrary display such as a liquid crystal panel.

The video signal processor 3 may supply the Y signal and the C signal to the display 4, or may supply a RGB signal to the display 4 by reconverting the signal-processed Y signal and the C signal into the RGB signal. The video signal processor 3 may supply a composite video signal to the display 4, or may supply a digital video signal, which conforms to the HDMI standard (HDMI is a registered trademark, and it stands for High-Definition Multimedia Interface), to the display 4.

The video signal processor 3 includes a multiple exposure synthesizer 31. Operations of the multiple exposure synthesizer 31 will be described later.

Specific configuration or operations of the video signal processor 3 are not particularly limited. In place of the display 4, a recorder that records the video signal, which is outputted from the video signal processor 3, may be provided.

The Y signal is inputted to an exposure evaluation value generator 5. The exposure evaluation value generator 5 generates an average luminance value of the respective frames as an exposure evaluation value based on the Y signal inputted thereto, and supplies the generated average luminance value to a controller 10. The exposure evaluation value generator 5 may be composed of a circuit, or may be composed of a processor.

The exposure evaluation value generator 5 may simply average the luminance in one frame and define the averaged luminance as the exposure evaluation value. The exposure evaluation value generator 5 may divide one frame into a plurality of regions, obtain first average values in the respective regions, weight the first average value in the center region, followed by averaging the weighted first average values and obtaining second average values, and define the second averaged values as the exposure evaluation value.

An exposure evaluation value generated by the exposure evaluation value generator 5 is inputted to the controller 10. The controller 10 can be composed of a CPU. The controller includes an exposure controller 101, a light source determiner 102, and a scene determiner 103 as a functional internal configuration. The exposure control section 101, the light source determiner 102 and the scene determiner 103 can be composed of software.

The exposure controller 101 controls the exposure setting circuit 22 so that the exposure evaluation value is constant. The exposure controller 101 sets shutter speed as setting of the exposure in the imaging element 21.

The exposure controller 101 supplies the exposure setting circuit 22 with a control value for setting the shutter speed such as 1/60 second or 1/250 second, etc. The exposure setting circuit 22 operates the imaging element 21 to perform imaging at the shutter speed indicated by the control value inputted thereto.

Figure 2:
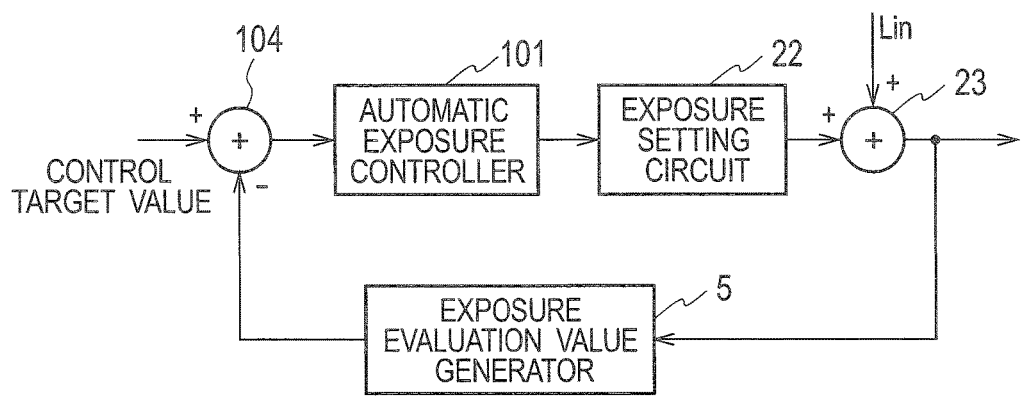
FIG. 2 is a block diagram showing an automatic exposure control model in the imaging device of at least one embodiment.

FIG. 2 shows an automatic exposure control model in the imaging device described above. The controller 10 holds therein a target brightness value as a control target value. The control target value may be a predetermined gray level.

A virtual subtracter 104 in the controller 10 subtracts the exposure evaluation value, which is outputted from the exposure evaluation value generator 5, from the control target value. A differential value between the control target value and the exposure evaluation value is inputted to the exposure controller 101. The exposure controller 101 controls the shutter speed set by the exposure setting circuit 22.

A virtual adder 23 in the imaging unit 2 performs, for the input light Lin, imaging processing by the shutter speed set by the exposure setting circuit 22. An output of the adder 23 is inputted to the exposure evaluation value generator 5, and is supplied to the display 4.

The automatic exposure control model shown in FIG. 2 composes a feedback control loop. Hence, the exposure evaluation value always coincides with the control target value. Even when the input light Lin functions as a disturbance and the luminance value is varied, the exposure evaluation value is controlled so as to be constant.

As described above, the imaging device shown in FIG. 1 controls the state (here, luminance) of the video signal, which is displayed on the display 4, not to be changed as much as possible even when brightness as an outside circumstance is changed.

Returning to FIG. 1, an infrared sensor (IR sensor) 6 detects an infrared ray. An A/D converter 7 converts a detection value, in which the IR sensor 6 detects the infrared ray, into a digital value. The digital value outputted by the A/D converter 7 is referred to as IRout. The digital value IRout here is not binary but multinary. The digital value IRout is inputted to the controller 10 and a band-pass filter (BPF) 8.

Figure 3:
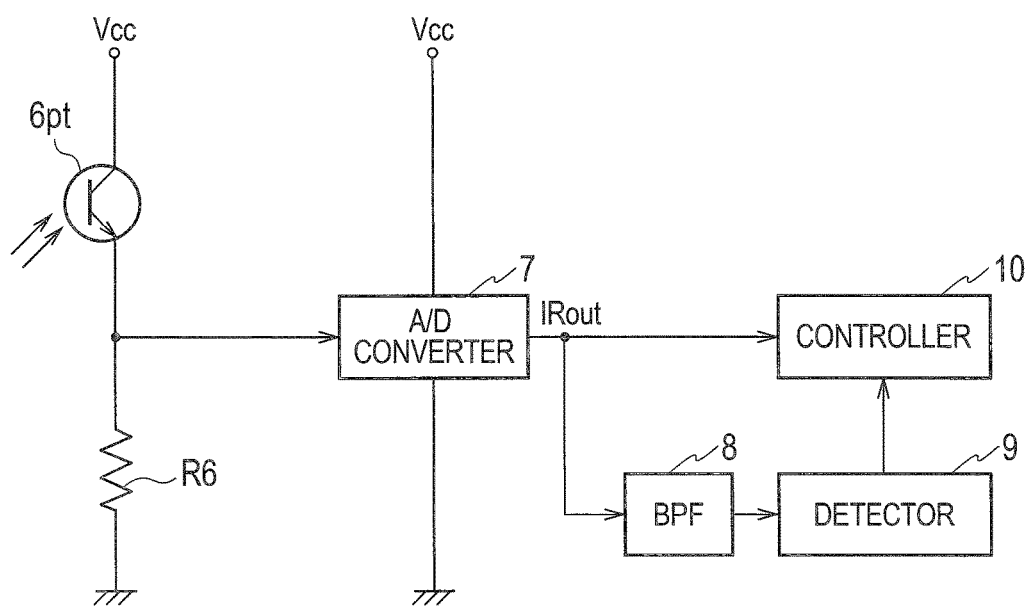
FIG. 3 is a circuit diagram showing a specific configuration of an infrared sensor 6 in FIG. 1.

As shown in FIG. 3, the IR sensor 6 can be composed of a phototransistor 6 pt. A power supply voltage Vcc is supplied to a collector terminal of the phototransistor 6 pt, and an emitter terminal of the phototransistor 6 pt is grounded through a resistor R6. Also with regard to the A/D converter 7, one end thereof is supplied with the power supply voltage Vcc, and other end thereof is grounded.

The band-pass filter 8 extracts a frequency component of 110 Hz, which is included in the inputted digital value IRout. A detector 9 detects whether or not the frequency component of 110 Hz is present. The detector 9 can be composed of a circuit. The detection value, which indicates the result of the detection by the detector 9, is inputted to the controller 10. For example, the detection value may be "1" when the detector 9 detects that a frequency component of 110 Hz is present, and otherwise, may be "0".

When the detector 9 detects that a frequency component of 110 Hz is present, it means that a flicker is included in the light detected by the IR sensor 6. When the detector 9 detects that a frequency component of 110 Hz is not present, it means that a flicker is not included in the light detected by the IR sensor 6.

The digital value IRout outputted from the A/D converter 7 and the detection value outputted from the detector 9 are inputted to the light source determiner 102. The light source determiner 102 determines that the light source is a light bulb, when it determines that the light includes an infrared ray when the inputted digital value IRout is equal to or greater than a predetermined value, and that the light includes a flicker by the detection value.

The light source determiner 102 determines that the light source is a fluorescent lamp, when it determines that the light does not include an infrared ray when the inputted digital value IRout is smaller than the predetermined value, and that the light includes a flicker by the detection value.

The light source determiner 102 determines that the light source is the sun, when it determines that the light includes an infrared ray when the inputted digital value IRout is equal to or greater than the predetermined value, and that the light does not include a flicker by the detection value.

A determination value that indicates a result of such a light source determination by the light source determiner 102 is inputted to the video signal processor 3. Since a color temperature of the light differs depending on the type of the light source, it is recommended to adjust a white balance in the video signal, which is generated by the video signal processor 3, depending on the type of the light source.

The video signal processor 3 adjusts the white balance in the video signal in response to the determination value inputted thereto. The imaging device shown in FIG. 1 controls the state (here, white balance) of the video signal, which is displayed on the display 4, not to be changed as much as possible even when the light source as the outside circumstance is changed.

Figure 4:
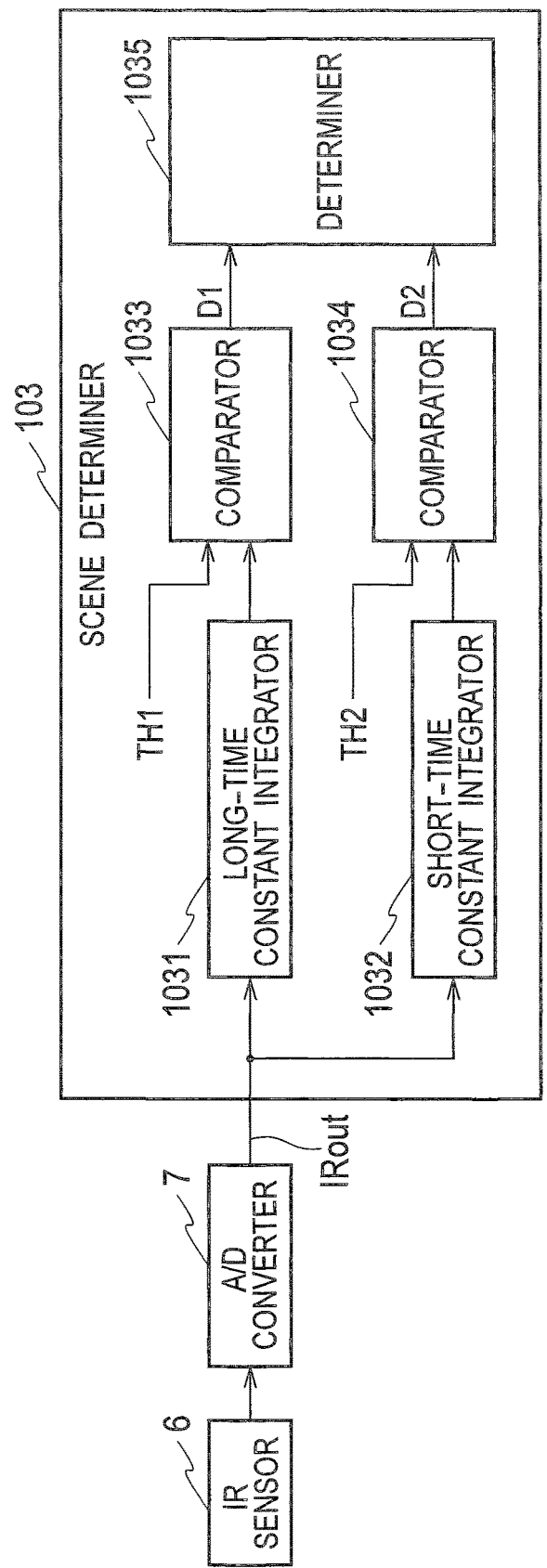
FIG. 4 is a block diagram showing a functional internal configuration of a scene determiner 103 in FIG. 1.

Next follows a description of the specific configuration and operations of the scene determiner 103 with reference to FIG. 4 to FIG. 6. As shown in FIG. 4, the scene determiner 103 includes a long-time constant integrator 1031, a short-time constant integrator 1032, comparators 1033 and 1034, and a determiner 1035 as a functional internal configuration.

In FIG. 4, the digital value IRout outputted from the A/D converter 7 is inputted to the long-time constant integrator 1031 and the short-time constant integrator 1032.

(a) of FIG. 5 shows an example of a waveform of the digital value IRout. It is assumed that a power supply of the imaging device is turned on at the time t0, and that the scene determiner 103 starts the scene determination at the time t1. It is assumed that the vehicle passes through a tunnel during a period from the time t2 to the time t3. N1 and N2 in the digital value IRout are noise components which occur between buildings, etc.

The long-time constant integrator 1031 integrates the inputted digital values IRout based on a first time constant, and generates a first integrated value. The first time constant is, for example, 30 minutes. The short-time constant integrator 1032 integrates the inputted digital values IRout based on a second time constant, and generates a second integrated value. The second time constant is, for example, 1 second.

The comparator 1033 compares the first integrated value and a predetermined threshold value TH1 with each other, and outputs a first detection value D1, which is low when the first integrated value is smaller than the threshold value TH1, and is high when the first integrated value is equal to or greater than the threshold value TH1. (b) of FIG. 5 shows an example of the first detection value D1 binarized by the comparator 1033.

The comparator 1034 compares the second integrated value and a predetermined threshold value TH2 with each other, and outputs a second detection value D2, which is low when the second integrated value is smaller than the threshold value TH2, and is high when the second integrated value is equal to or greater than the threshold value TH2. (c) of FIG. 5 shows an example of the second detection value D2 binarized by the comparator 1034. In (c) of FIG. 5, a period during which the second detection value D2 becomes low may be shifted temporally with respect to the period between the time t2 and the time t3; however, such a temporal shift is ignored here.

The determiner 1035 determines a scene based on the first detection value D1 and the second detection value D2. As shown in FIG. 6, when the first detection value D1 is low (L), the determiner 1035 determines that the imaging device (imaging unit 2) captures images of a subject in the nighttime irrespective of the value of the second detection value D2.

When both of the first and second detection values D1 and D2 are high (H), the determiner 1035 determines that the imaging device captures images of a subject in the daytime.

When the first detection value D1 is H, and the second detection value D2 is L, the determiner 1035 determines that the vehicle runs inside a tunnel though the imaging device captures images of a subject in the daytime. Such a circumstance where the first detection value D1 is H and the second detection value D2 is L is a circumstance where the imaging device captures images of a subject in the daytime in a specific state where the light is temporarily cut off.

In the embodiment, the scene determiner 103 determines the scene by using the digital values IRout which are based on the detection values in which the IR sensor 6 (that is provided for detecting the type of the light source) detects the infrared ray. The scene determiner 103 may determine the scene by using digital values which are based on brightness detection values detected by an illuminance sensor in place of the digital values of the IR sensor 6.

The scene determiner 103 may determine the scene by using digital values which are based on brightness detection values detected by an image sensor with a wide dynamic range in place of the digital values of the IR sensor 6.

The scene determiner 103 just needs to determine the scene by using such digital values which are based on the brightness detection values detected by the sensor such as the IR sensor 6, the illuminance sensor, or the image sensor, etc., which detects the outside brightness. Note that, using the IR sensor 6 makes it possible to detect the type of the light source and determine the scene, and accordingly, it is preferable to use the IR sensor 6.

In FIG. 4, the long-time constant integrator 1031 and the comparator 1033 detects whether the period during which a predetermined brightness has been detected by the sensor continues for 30 minutes as the first time. The short-time constant integrator 1032 and the comparator 1034 detects whether the period during which the predetermined brightness has been detected by the sensor continues for 1 second as the second time.

It is possible to use a counter, which counts the time, in place of the long-time constant integrator 1031 and the comparator 1033, or the short-time constant integrator 1032 and the comparator 1034.

The scene determiner 103 just needs to include a first detector that detects whether or not the period during which a predetermined brightness has been detected by the sensor continues for the first time, and a second detector that detects whether or not the period during which a predetermined brightness has been detected by the sensor continues for the second time shorter than the first time.

When the scene determiner 103 determines that the circumstance where the imaging device captures images is either in the nighttime, in the daytime, or inside a tunnel in the daytime, it is recommended to control the exposure as follows.

When the determination result indicates "in the daytime", the exposure controller 101 supplies the exposure setting circuit 22 with a control value for setting relatively high shutter speed. When the determination result indicates "in the nighttime", the exposure controller 101 supplies the exposure setting circuit 22 with a control value for setting relatively low shutter speed. In such a way, the luminance can be enhanced even in the nighttime, and the luminance of the video signal generated by capturing images of the subject can be controlled so as to be prevented as much as possible from being changed.

When the determination result indicates "in the daytime inside a tunnel", the exposure controller 101 supplies the exposure setting circuit 22 with a control value for setting a relatively low shutter speed. In such a way, even when the scene gets dark since the light is temporarily cut off, the luminance can be enhanced, and the luminance of the video signal generated by capturing images of the subject can be controlled so as to be prevented as much as possible from being changed.

When the determination result indicates "in the nighttime" or "in the daytime inside of a tunnel", the exposure controller 101 may allow the exposure setting circuit 22 to execute multiple exposure and widen the dynamic range, instead of simply slowing the shutter speed to enhance the luminance.

Specifically, the exposure controller 101 controls the exposure setting circuit 22 so that the imaging element 21 captures images at a relatively low shutter speed and a relatively high shutter speed alternately. The relatively low shutter speed is, for example, 1/60 second, and the relatively high shutter speed is, for example, 1/250 second.

Then, as shown in FIG. 7, long-time exposure frames FLE1, FLE2 . . . and short-time exposure frames FSE1, FSE2 . . . are alternately outputted from the imaging unit 2.

The multiple exposure synthesizer 31 synthesizes the long-time exposure frame FLE1 and the short-time exposure frame FSE1 with each other to generate a synthetic frame FMX1. At the timing of the next frame, the multiple exposure synthesizer 31 repeatedly outputs the synthetic frame FMX1.

The multiple exposure synthesizer 31 synthesizes the long-time exposure frame FLE2 and the short-time exposure frame FSE2 with each other to generate a synthetic frame FMX2. At the timing of the next frame, the multiple exposure synthesizer 31 repeatedly outputs the synthetic frame FMX2. Thereafter, the multiple exposure synthesizer 31 repeats similar operations.

When the determination result indicates "in the daytime", the exposure controller 101 controls the exposure setting circuit 22 to execute, not the multiple exposure but the usual exposure.

At this time, the exposure controller 101 equalizes the shutter speed set as the relatively low shutter speed and the shutter speed set as the relatively high shutter speed to each other, and can thereby execute substantially the usual exposure.

If the multiple exposure synthesizer 31 synthesizes two frames, which are captured at the same shutter speed with each other, to generate the synthetic frames FMX1, FMX2 . . . , then the exposure becomes not the multiple exposure but equivalent to the usual exposure. In such a way, no matter which the determination result may indicate "in the daytime", "in the nighttime", or "in the daytime inside a tunnel", the operations in the multiple exposure synthesizer 31 can be uniform.

The present invention is not limited to the embodiment described above, and is changeable in various ways within the scope without departing from the scope of the present invention. In the configuration shown in FIG. 1, the use of hardware or software is optional.

What is claimed is:

1. An imaging device comprising:
    an imaging unit configured to capture images of a subject;
    a sensor configured to detect brightness; and
    a processor,
    wherein the processor functions as:
        a first detector configured to detect whether or not a period during which a predetermined brightness has been detected by the sensor continues for a first period of time;
        a second detector configured to detect whether or not a period during which the predetermined brightness has been detected by the sensor continues for a second period of time shorter than the first period of time; and
        a determiner configured to determine a circumstance where the imaging unit captures images of the subject during daytime in a specific state where light is temporarily cut off, based on a first detection result by the first detector and a second detection result by the second detector.

2. The imaging device according to claim 1, wherein the processor functions as the first detector comprising:
    a first integrator configured to integrate an output of the sensor by a first time constant and generate a first integrated value; and
    a first comparator configured to binarize the first integrated value based on a comparison with a first threshold value, and
    the processor functions as the second detector comprising:
    a second integrator configured to integrate the output of the sensor by a second time constant shorter than the first time constant and generate a second integrated value; and
    a second comparator configured to binarize the second integrated value based on a comparison with a second threshold value.

3. The imaging device according to claim 1, wherein the processor functions as an exposure controller configured to control exposure in the imaging unit in accordance with a result of the determination by the determiner.

4. The imaging device according to claim 3, wherein when the determiner determines a circumstance where the imaging unit captures images of the subject in the specific state, the exposure controller allows the imaging unit to alternately execute long-time exposure by a first shutter speed and short-time exposure shorter than the long-time exposure, and
    the imaging device further comprises a multiple exposure synthesizing circuit configured to synthesize a long-time exposure frame by the long-time exposure and a short-time exposure frame by the short-time exposure and generate a synthetic frame.

5. The imaging device according to claim 1, wherein the sensor is an infrared sensor provided for detecting a type of light source.

6. A scene determination method comprising:
    detecting, using a processor, whether or not a period during which a predetermined brightness has been detected by a sensor that detects brightness continues for a first period of time;
    detecting, using the processor, whether or not a period during which a predetermined brightness has been detected by the sensor continues for a second period of time shorter than the first period of time;
    determining, using the processor, that a scene is in a nighttime unless a period during which the predetermined brightness has been detected continues for the first period of time;
    determining, using the processor, that a scene is in a daytime if a period during which the predetermined brightness has been detected continues for the first and second period of time; and
    determining, using the processor, that a scene is in a daytime in a specific state where light is temporarily cut off, if a period during which the predetermined brightness has been detected continues for the first period of time and unless a period during which the predetermined brightness has been detected continues for the second period of time.

* * * * *